United States Patent
Slagel

[15] 3,664,990
[45] May 23, 1972

[54] ACRYLIC AMINIMIDES AND POLYMERS THEREOF

[72] Inventor: Robert C. Slagel, Savage, Minn.

[73] Assignee: Ashland Oil, Inc., Ashland, Ky.

[22] Filed: Mar. 20, 1970

[21] Appl. No.: 24,948

Related U.S. Application Data

[60] Division of Ser. No. 636,273, May 5, 1967, Pat. No. 3,527,802, which is a continuation-in-part of Ser. No. 514,705, Dec. 15, 1965, abandoned.

[52] U.S. Cl. ........................260/85.5 R, 260/77.5, 260/79.3, 260/80.3 N, 260/85.7, 260/86.1 N, 260/87.5, 260/88.1 PN, 260/88.3 R, 260/88.7 A, 260/89.7 R, 260/294, 260/326.3, 260/453, 260/465.4, 260/558, 260/561, 260/562, 260/874, 260/895, 260/898

[51] Int. Cl. ....................C08f 3/00, C08f 15/18, C08f 15/22
[58] Field of Search....................260/88.3, 85.5 R, 85.5 AM, 260/86.1 N, 88.7, 87.5, 88.1 PN, 89.7 R, 80.3 N

[56] References Cited

UNITED STATES PATENTS

| | | | |
|---|---|---|---|
| 3,527,802 | 9/1970 | Slagel | 260/85.5 AM |
| 2,326,287 | 8/1943 | Coffman | 260/86.1 N |
| 3,242,140 | 3/1966 | Hoover | 260/80 P |
| 3,485,806 | 12/1969 | Bloomquist et al. | 260/86.1 N |
| 3,450,673 | 6/1969 | McKillip | 260/75 |
| 2,334,476 | 11/1943 | Coffman | 260/86.1 N |

*Primary Examiner*—Harry Wong, Jr.
*Attorney*—Sherman J. Kemmer, William G. Ewert, Cecil C. Schmidt, Larry W. Evans and Plumley, Tyner & Sandt

[57] ABSTRACT

"Acrylic" aminmides are prepared from "acrylic" acids or derivatives thereof. The "acrylic" aminimides can be homopolymerized and copolymerized to result in functional group-containing polymeric products capable of thermosetting. The "acrylic" aminimides have the general formula:

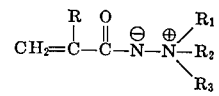

wherein R is a hydorgen, lower alkyl ($C_1 - C_6$), aryl, chlorine, fluorine, bromine, or cyano group and $R_1$, $R_2$, and $R_3$ are hydrocarbon radicals and $R_1$ and $R_2$ can be combined to form a heterocyclic ring with the nitrogen.

10 Claims, No Drawings

ACRYLIC AMINIMIDES AND POLYMERS THEREOF

This application is a division of Ser. No. 636,273 filed May 5, 1967, now U.S. Pat. No. 3,527,802, the latter in turn being a continuation-in-part of Ser. No. 514,705, filed Dec. 15, 1965, now abandoned.

The present invention relates to novel "acrylic" aminimides and to polymers thereof. In another aspect, the present invention relates to processes for the preparation of the "acrylic" aminimides, their polymerization, and the subsequent chemical modification of such polymers.

The "acrylic" aminimides of the present invention have the general formula:

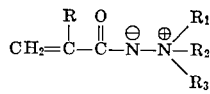

wherein R is a hydrogen, lower alkyl ($C_1$–$C_6$), aryl, chlorine, fluorine, bromine, or cyano group, $R_1$ and $R_2$ are aliphatic or aryl hydrocarbon radicals having from one to 22 carbon atoms or radicals in which $R_1$ and $R_2$ are combined to form heterocyclic rings with the nitrogen, and wherein $R_3$ is a saturated or unsaturated aliphatic hydrocarbon radical of one to 22 carbon atoms. The term "aryl" as employed herein is meant to define an aromatic radical in which the unsatisfied valence is at a carbon atom of the aromatic nucleus. The term "acrylic" will be understood as being generic to the type of compound defined by the foregoing formula.

The novel aminimides of the present invention are prepared by either one of two methods. In the first method, the aminimide is prepared by reacting a hydrazone with an "acrylic" acid chloride in the presence of an inert organic solvent, subsequently reacting the resulting hydrazide with a quaternizing agent to form the hydrazinium salt, and then dehydrohalogenating the reaction product in the presence of a base in accordance with the following reaction scheme:

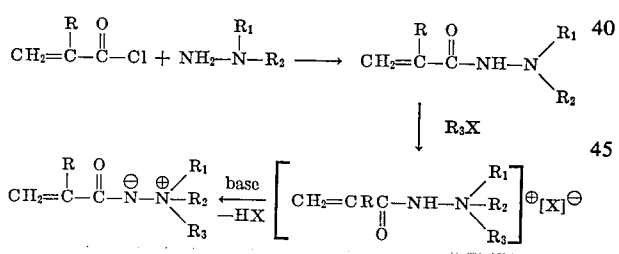

in which R, $R_1$, $R_2$, and $R_3$ have the above-indicated meaning, and X can be any suitable anion.

The unsymmetrical hydrazine employed in the formation of the aminimides of the present invention can be obtained by the reaction of a halo-amine with a tertiary amine, resulting in the hydrazinium salt which is reacted with a base to form the hydrazine. Since the reaction is well-known in the art, no further description is deemed necessary.

The unsymmetrical hydrazine is reacted with the "acrylic" acid chloride in the presence of an inert solvent such as benzene, dimethyl sulfoxide, acetonitrile, dioxane, tetrahydrofuran, ethers, e.g. diethyl ether, glymes (i.e., dimethyl ethers of ethylene glycol), and the like. The solvent is employed in sufficient amounts to allow the formation of a fluid reaction mixture. Preferably, the reaction is conducted at ambient temperature and pressure conditions, although higher and lower temperatures or higher and lower pressures can be employed if called for by the reagents employed in the particular synthesis. In general, the reaction conditions employed should provide for the removal of the by-product HCl. Although the reaction proceeds rapidly, it is generally preferred to employ longer reaction times to assure completion of the reaction and thereby higher yields of the hydrazide.

An excess of either reagent can be employed, although such is not necessary in view of the quantatative yields obtained by the use of nearly equivalent amounts of the acid chloride and the hydrazine. The hydrazide may precipitate out of the solvent, depending on the solvent. If the hydrazide does not precipitate, it can be readily isolated by evaporation of the solvent.

The hydrazide is quaternized with a compound having the general formula:

wherein $R_3$ is a saturated or unsaturated aliphatic hydrocarbon radical and preferably a lower alkyl radical, and X can be any quaternizing anion but is preferably an aryl sulfonate radical or a halogen radical such as chlorine, bromine or iodine.

Suitable quaternizing agents, therefore, include methyl chloride, methyl bromide, ethyl chloride, methyl iodide, propyl chloride, ethyl bromide, methyl benzene sulfonate, methyl toluene sulfonate (methyl tosylate), and ethyl toluene sulfonate.

The reaction of the hydrazide with the quaternizing agent is preferably conducted in the presence of a solvent which is generally of the type of inert solvent hereinabove indicated and is also employed in the same amounts. Reaction temperatures will vary from room temperature to elevated temperatures which do not cause the decomposition of the reagents or products. The solution obtained in the formation of the hydrazide can be directly employed in the described quaternization.

The hydrazinium salt is dissolved in water or an alcohol such as methanol, and dehydrohalogenated to the aminimide by titrating with an alcoholic base to a neutral end point. Preferred bases are the alkali metal bases such as sodium hydroxide or potassium hydroxide. The aminimide is isolated by precipitating the alkali metal salt and evaporating the solvent.

The unsymmetrical hydrazine, which is reacted with the "acrylic" acid chloride to form the "acrylic" hydrazine, has the general formula:

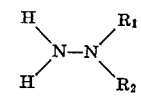

wherein $R_1$ and $R_2$ have the above-indicated meaning.

Preferably, $R_1$ and $R_2$ are lower alkyl groups, phenyl or substituted phenyl groups, or together with the nitrogen form such heterocyclic ring compounds as pyrrolidine, pyrrole, pyrroline, or piperidine. Specific examples of the unsymmetrical hydrazines employed include dimethyl hydrazine, diethyl hydrazine, methyl-ethyl hydrazine, dibutyl hydrazine, N-amino-2-phenyl pyrrolidine, phenyl-methyl hydrazine, diphenyl hydrazine, and dicresyl hydrazine.

The "acrylic" acid chlorides employed in the present invention are formed from the "acrylic" acids which are well-known in the art. The acid chloride is formed from the acid by reaction with excess benzoyl chloride or thionyl chloride at room temperature. The acid chloride can also be prepared by reacting the sodium salt of the "acrylic" acid with oxalyl chloride in benzene.

Suitable "acrylic" acid chlorides include acrylyl chloride, methacrylyl chloride, ethacrylyl chloride, α-phenylacrylyl chloride, α-chloroacrylyl chloride, α-fluoroacrylyl chloride, and α-cyanoacrylyl chloride.

In the alternate way of preparing the novel aminimides, a hydrazinium salt is reacted with an alkyl ester of the acrylic acid in the presence of a base in accordance with the following reaction scheme:

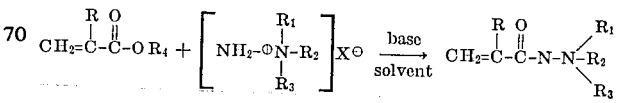

wherein R and $R_1$ to $R_3$ have the above-indicated meaning, and X is a radical capable of forming an anion and preferably is a sulfonate radical or a halogen, e.g. chlorine, iodine, or bromine. $R_4$ can be an alkyl radical of one to 22 carbon atoms but preferably is a lower alkyl radical of one to six carbon atoms. The base is preferably a strong base such as a metal alkoxide, e.g. sodium alkoxide or an alkali metal hydroxide, e.g. sodium hydroxide or potassium hydroxide. The reaction is preferably carried out in an organic solvent such as tetrahydrofuran, methanol, isopropanol, t-butanol, benzene, and the like.

The hydrazinium salt employed in the formation of the aminimide can be obtained by the reaction of a halo-amine and a tertiary amine. The halo-amine has the general formula:

$$NH_2X,$$

wherein X is a halogen, e.g. chlorine or bromine. Ordinarily, X is chlorine and the chloroamine is obtained by the reaction of ammonia with chlorine. This reaction is preformed at temperatures of from 20° to 100° C and at pressures of 0 to 100 psi. Preferably, the reaction is conducted in the vapor phase and preferably an excess of ammonia is used.

The tertiary amine which can be reacted with a halo-amine to produce the hydrazinium salt is an amine having the formula:

$$NR_1R_2R_3,$$

wherein $R_1$, $R_2$, and $R_3$ have the above-indicated meaning. The reaction of tertiary amine and halo-amine is usually conducted by bubbling the halo-amine in gaseous form through the tertiary amine which is usually in liquid form at room temperature in atmospheric pressure.

The hydrazinium salt can also be obtained by the reaction of an unsymmetrical hydrazine and a quaternizing agent having the formula:

$$R_3X,$$

wherein $R_3$ has the above-indicated meaning, and X can be any quaternizing anion, but is preferably an aryl sulfonate radical or a halogen such as chlorine, bromine or iodine. Suitable unsymmetrical hydrazines which can be employed in the formation of the hydrazinium salt have been set forth hereinabove.

The reaction of the unsymmetrical hydrazine with the quaternizing agent can be conducted in the absence of a solvent or, if a homogenous liquid mixture of the reagent can be formed, in the presence of a diluent which is generally a non-polar solvent such as carbon disulfide or benzene. Alternatively, the reaction can also be carried out in a polar solvent such as isopropanol, methanol, or t-butanol. The reaction temperature can vary from room temperature to elevated temperatures which do not cause decomposition of the reagents or products. Generally, the reaction is carried out at room temperature.

The hydrazinium salt is then reacted with the ester in the presence of a base and preferably in the presence of a polar solvent of the type described hereinabove, such as an alcohol, to produce the aminimide. Preformed hydrazinium salt solutions can similarly to employed in the synthesis of the aminimide. The reaction mixture is then evaporated and the aminimide can be extracted with a suitable solvent or with the reaction solvent which does not cause appreciable solution of the by-product of the cation of the base with the anion of the quaternary salt.

Various methods can be employed to purify the resulting aminimides such as extraction followed by crystallization, precipitation, sublimation, evaporation, or chromatographic or ion exchange separation.

The reaction of the ester with the hydrazinium salt or solution thereof is carried out at temperatures maintained in the range between 0° and 150°C and preferably between 20° and 60°C. Although both lower and higher pressures can be used, it is preferred to conduct the reaction at atmospheric pressure. The preferred solvents are alcohols such as tertiary butanol and isopropanol. The reagents, i.e., the ester, the hydrazinium salt, and the base, are employed in essentially equimolar ratios, although such is not critical. In general, sufficient solvent is employed to allow the formation of a liquid mixture and preferably from 500 to 1,000 ml. per mole of reactants is used. The time of reaction may vary from 1 minute to 12 hours and generally it is in the range of 2 to 5 hours.

Aminimides which can be prepared by the described processes include trimethylamine acrylimide, trimethylamine methacrylimide, dimethyl-ethylamine acrylimide, diethyl-methylamine methacrylimide, triethylamine methacrylimide, dipropylmethylamine acrylimide tributylamine acrylimide, phenyl-dimethylamine acrylimide, N-methylpyrrol acrylimide, N-methylpyrrol methacrylimide, N-ethyl-pyrroline acrylimide, N-ethylpyrroline methacrylimide, N-phenyl-pyrroline acrylimide, trimethylamine α-chloroacrylimide, trimethylamine ethacrylimide, trimethylamine α-phenylacrylimide, trimethylamine α-cyanoacrylimide, and triethylamine α-chloroacrylimide.

The novel "acrylic" aminimides of the present invention can be polymerized through addition to the double bond. In general, the polymerization is carried out in a polar medium such as water or acrylonitrile using a free radical polymerization initiator such as an azo-bis-nitrile or a peroxide. In view of the instability of the aminimide group at temperatures above 150° C, as more specifically explained hereinbelow, polymerization temperatures are within the range of 25° to 120° C and preferably within the range of 60° to 100° C. The polymerization catalyst is employed in concentrations normally employed in the polymerization of vinyl monomers. Polymerization times will vary depending on the polymerization temperature, the concentration and type of initiator, and the degree of conversion of monomer to polymer desired. Complete conversion of monomer to polymer may require several days under mild conditions.

The aminimides can furthermore be copolymerized in all ratios with vinyl monomers such as other acrylic monomers, vinyl esters, vinyl halides, and vinyl aromatic monomers. The term "acrylic monomers" is defined as including monomers containing the structure:

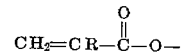

wherein R has the above-indicated meaning. Suitable acrylic comonomers for the aminimides of the present invention include ethyl acrylate, methyl acrylate, butyl acrylate, methyl methacrylate, ethyl methacrylate, hydroxy substituted alkyl acrylates and methacrylates such as hydroxy ethyl methacrylate, hydroxy propyl methacrylate, and the corresponding acrylates, alkoxy substituted alkyl acrylates and methacrylates such as methoxy ethyl acrylate and methoxy ethyl methacrylate and the like. The copolymerization can be conducted in bulk or in a common solvent at temperatures of 25° to 120° C using a peroxide, an azo-bis-nitrile, or similar free radical initiator.

The utility of the polymers and copolymers of the present invention is based on their ability to be converted to polyisocyanates which have a well-established utility in the formation of polyurethanes. The conversion is generally accomplished by pyrolysis. The conversion is illustrated by the following equation:

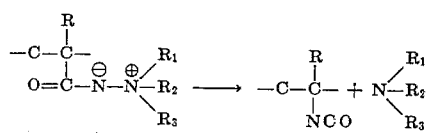

in which R and $R_1$ to $R_3$ have the above-indicated meaning.

The tertiary amine by-products are well-known catalysts in the polymerization of isocyanates with hydroxyl-terminated polyesters, polyethers and polyols.

Pyrolysis of the aminimide in monomeric or polymeric form can be conducted by heating the aminmide to temperatures above about 150° C, and results in the formation of the isocyanate and a tertiary amine by the above equation.

Although it is possible to convert the aminimide of the present invention to the isocyanate prior to polymerization, it is generally preferred to convert the aminimide subsequent to polymerization in view of the greater chemical stability of the aminimide group as compared to the isocyanate group. This is particularly significant in the formation of urethane linkages in the sense that the aminimide can be admixed with polyhydroxy compounds and form a stable system. On heating such system, the aminimide is converted to the isocyanate, which reacts with the polyhydroxy compound, while simultaneously releasing a tertiary amine, which acts as a catalyst for the reaction of the isocyanate with the polyhydroxy compound. It will be apparent, therefore, that the incorporation of a small number of the novel aminimide monomers into an otherwise unreactive polymer (i.e., containing no isocyanate groups or Zerewitinoff hydrogen) converts such polymer chains into a crosslinkable system which can be crosslinked with a curing agent, i.e., an agent which contains two or more Zerewitinoff hydrogens. The meaning of the term "Zerewitinoff hydrogen" is well-established in the polyurethane art and includes, in particular, the hydroxyl group. The polymer systems of the present invention have the additional advantage of being stable at temperatures below 150° C in the presence of compounds containing a Zerewitinoff hydrogen. The use of the homopolymers and copolymers of the present invention alone or in combination with other compatible resins in coating vehicles not only permits the crosslinking of such coating vehicles on heating if such coating vehicles contain the necessary hydroxyl groups, but furthermore would allow the chemical bonding of the coating to the substrate if such substrate contains reactive hydroxyl groups. Additionally, the presence of the polar group introduced by the aminimide will result in better bonding to polar substrates by virtue of the attraction of the two groups even in the absence of chemical reaction.

The polymers of the present invention which contain a higher number of aminimide units have utility in polyurethane systems which are well-known in the art. The acrylic aminimide can furthermore be converted to the isocyanate and then employed directly in polyurethane systems, thereby introducing reactive double bonds into the system.

The foregoing discussion of the utility of the aminimides of the present invention and their polymers is not intended to limit the utility of the aminimides to such, since many other applications will be apparent to those skilled in the art from the dual reactivity of the aminimides.

An alternative way of preparing the novel polymers of the aminimides of the present invention comprises the polymerization of the "acrylic" hydrazinium salt using the above-described techniques followed by conversion of the hydrazinium salt to the aminimide polymer again using the techniques hereinabove described.

The formation of the novel aminimides, their polymerization, and their conversion to isocyanates is further illustrated by the following examples in which all units of quantity are by weight unless otherwise stated.

EXAMPLE 1

To 264 g (4.3 moles) of unsymmetrical dimethyl hydrazine in two liters of cold benzene is added 208 g (20 moles) of methacrylyl chloride with stirring. After two hours, the addition is completed and a yellow solid precipitates out. The reaction mixture is warmed to room temperature and the product is filtered. The product is extracted four times with 1 liter portions of warm benzene. Evaporation of the benzene extract in vacuo results in 137.4 g (53 percent) of 1,1-dimethyl-2-methacrylyl hydrazine, a white solid having a melting point of 67° to 70° C. On recrystallization, the product melts at 73°C.

The infrared spectrum of the product shows a NH absorption band at 3,200 cm$^{-1}$, double bond absorption at 3,040 and 1,630 cm$^{-1}$, and amide carbonyl absorptions at 1,670 and 1,540 cm$^{-1}$.

In 225 ml of acetonitrile is dissolved 20.0 g (0.154 mole) of the 1,1-dimethyl-2-methacrylyl hydrazine and 28.6 g (1.54 moles) of methyl-p-toluene sulfonate. The reaction mixture is agitated and refluxed for 6 hours. On cooling to room temperature, 2-methacrylyl-1,1,1-trimethyl hydrazinium p-toluene sulfonate crystallizes out of the reaction mixture. The product obtained weighs 32.2 g (68 percent), and has a melting point of 150° to 151° C. On evaporation of the solvent, an additional 15 g of the sulfonate is obtained.

The 2-methacrylyl-1,1,1-trimethyl hydrazinium p-toluene sulfonate is dissolved in 100 ml of distilled water and 10% sodium hydroxide solution is added until a phenophthalein end point is reached. Evaporation of the water in vacuo results in a white solid which is extracted with warm chloroform. Evaporation of the chloroform results in 9.0 g (quantitative) of trimethylamine methacrylylimide having a melting point of 149° to 152° C. On recrystallization from hexane, the product has a melting point of 149° to 150° C. Infrared and nuclear magnetic resonance analyses confirm the structure of the product.

Analysis Calculated: $C_7H_{14}N_2O$: C, 59.12; H, 9.92; N, 19.70

Found: C, 59.24; H, 9.89; N, 19.54.

EXAMPLE 2

To 75 ml of tertiary butanol is added 11.0 g (0.1 mole) of trimethyl hydrazinium chloride, 10.0 g (0.1 mole) of methyl methacrylate, and 5.4 g (0.1 mole) of sodium methoxide. The temperature of the reaction mixture is increased to 48° C and kept at 48°C for 6 hours with agitation. The reaction mixture is then pressure filtered to remove the salt formed. On evaporation of the filtrate in vacuo, 11 g (78 percent yield) of trimethylamine methacrylimide is obtained. On recrystallization from benzene, the product is found to have a melting point of 149° to 150° C.

EXAMPLE 3

To a solution of 264 g (4.3 moles) of unsymmetrical dimethyl hydrazine in 2 liters of cold benzene is added 181 g (2.0 moles) of acrylyl chloride. On completion of the addition (4 hours), a yellow solid precipitates out of the reaction mixture. The reaction mixture is allowed to warm to room temperature and suction filtered. The solid is then extracted four times with one liter portions of warm benzene. On evaporation of the benzene in vacuum 54.6 g of a white solid is obtained having a melting point of 77° to 83° C. Recrystallization with hexane results in 34.9 g of 1,1-dimethyl-2-acrylyl hydrazine having a melting point of 86° to 87° C. Infrared analysis confirms the structure of the product obtained.

To 25 g (0.22 mole) of 1,1-dimethyl-2-acrylyl hydrazine in 170 g of acetonitrile is added 31.0 g (0.22 mole) of iodomethane. The reaction mixture is refluxed with stirring for 3 hours. On removal of the solvent in vacuo, 54.8 g (98 percent yield) of 2-acrylyl-1,1,1-trimethyl hydrazinium iodide, a pale yellow solid having a melting point of 128° to 133° C, is obtained.

A solution of 50 g of 2-acrylyl-1,1,1-trimethyl hydrazinium iodide in 80 ml of distilled water is prepared and 10 percent sodium hydroxide solution is added until a phenophthalein end point is reached. On evaporation a gummy solid is obtained which is extracted with chloroform using a Soxhlet extractor. Evaporation of the chloroform results in 23.9 g (95 percent) of a yellow solid. Sublimation of this product results in trimethylamine acrylimide, a white crystalline product having a melting point of 102° to 104° C. Infrared and nuclear magnetic resonance analyses confirm the structure of the product.

Analysis Calculated: $C_6H_{12}N_2O$: C, 56.27; H, 9.37; N, 21.86

Found: C, 56.10; H, 9.35; N, 21.28

EXAMPLE 4

In 75 ml of tertiary butanol is placed 8.6 g (0.1 mole) of methyl acrylate, 11.0 g (0.1 mole) of trimethyl hydrazinium chloride, and 5.4 g. of sodium methoxide. The reaction mixture is agitated and heated at 45° C for 7 hours. On filtration of the salt formed, the reaction mixture is evaporated to give 11.4 g (89 percent) of viscous yellow liquid which crystallizes on standing. Vacuum sublimation of the crystalline solid results in trimethylamine acrylimide.

EXAMPLE 5

In 15 parts of distilled water is dissolved 3.7 parts of trimethylamine methacrylimide and 0.1 percent (based on monomer) of azo-bis-isobutyronitrile dissolved in 1 part of acetone is added. The reaction vessel is purged with nitrogen and the temperature of the reaction mixture is increased to 82° C, at which temperature the mixture is held for 2.25 hours under nitrogen. The reaction mixture is cooled to room temperature and poured into 20 parts of acetone. A white solid precipitates. On drying over phosphorus pentoxide at 65° C, 1.9 parts of a white homopolymer of trimethylamine methacrylimide is obtained. Infrared analysis of the polymer shows strong absorption at 1565 cm$^{-1}$ corresponding to the aminimide carbonyl band. Nuclear magnetic resonance analysis also confirms the structure of the polymer. On heating to temperatures of 176° C, the aminimide groups in the polymer are converted to isocyanate groups.

EXAMPLE 6

In 14 parts of water is dissolved 5 parts of 2-methacrylyl-1,1,1-trimethyl hydrazinium-p-toluene sulfonate and 0.1 percent of azo-bis-isobutyronitrile dissolved in 1 part of acetone is added. The reaction vessel is purged with nitrogen and the temperature of the reaction mixture is increased to 82° C, at which temperature the reaction mixture is maintained for 6 hours under nitrogen. The reaction mixture is then poured into 200 parts of acetone with stirring. The resulting fine, white precipitate is filtered, washed repeatedly with hot acetone and dried in vacuum over phosphorus pentoxide to result in 0.5 parts of a homopolymer of 2-methacrylyl-1,1,1-trimethyl hydrazinium-p-toluene sulfonate. Infrared and nuclear magnetic resonance analyses confirm the structure of the polymer.

The polymer is dissolved in about 15 parts of distilled water and 10 percent sodium hydroxide solution is added until the phenophthalein end point is reached. The solution is then evaporated to near dryness in vacuo and poured into excess acetone which precipitates a white solid identified as the homopolymer of trimethylamine methacrylimide. Infrared and nuclear magnetic resonance analyses confirm the structure of the homopolymer.

EXAMPLE 7

In 6.3 parts of methyl methacrylate is dissolved 1 part of trimethylamine methacrylimide and 0.2 percent of azo-bis-isobutyronitrile in 0.5 parts of methyl methacrylate is added to the mixture. The reaction vessel is purged with nitrogen and the reaction mixture is heated to 70 C for 1.5 hours under nitrogen. The polymerized reaction mixture is added to excess acetone, causing a solid precipitate to form which is washed with methanol. The resulting polymer is crushed and dried at 100° C. The polymer is dissolved in chloroform and drawn on a glass plate to form a hard, colorless film that remains clear when baked in an oven at 110° C for 16 hours. Infrared and nuclear magnetic resonance analyses confirm the structure of the polymer to be a copolymer of trimethylamine methacrylimide and methyl methacrylate containing 10 percent trimethylamine methacrylimide and 90 percent of methyl methacrylate. On heating of the copolymer to a temperature of 175° C, the aminimide groups are converted to isocyanate groups.

EXAMPLE 8

Trimethylamine methacrylimide, 1.4 parts, is dissolved in 5.5 parts of warm vinyl acetate and 0.2 percent of azo-bis-isobutyronitrile dissolved in 1.0 part of vinyl acetate is added. The reaction vessel is purged with nitrogen and the reaction mixture is heated to 70° C and maintained at 70° C for 12 hours under a flow of nitrogen. The reaction product is steam distilled and subsequently heated with chloroform. A white solid polymer is obtained on cooling the chloroform solution which is washed and dried. A part of the chloroform solution containing about 30 percent of polymer is drawn on a glass plate and allowed to dry. A clear film is obtained. Infrared and nuclear magnetic resonance analyses of the film indicate the polymer to be a copolymer of trimethylamine methacrylimide and vinyl acetate, containing about 30 percent of trimethylamine methacrylimide and 70 percent of vinyl acetate. On heating the polymer to about 150° C, the aminmide groups are converted to isocyanate groups.

EXAMPLE 9

Into a pressure reaction vessel is charged 2 parts of trimethylamine methacrylimide and 30 parts of methyl ethyl ketone. The reaction vessel is cooled to below −75° C in an acetone-dry ice bath and 23.3 parts of vinyl chloride in added together with 0.02 part of azo-bis-isobutyronitrile. The vessel is sealed and brought to a temperature of 50° to 60° C, at which temperature the reaction mixture is agitated for a period of 20 hours. The vessel is then cooled again to −75° C, opened and allowed to come to room temperature. The polymer precipitates out of the reaction mixture and is separated and dried. Infrared analysis confirms vinyl chloride and trimethylamine methacrylimide as being incorporated into the polymer, and nuclear magnetic resonance and micro analyses demonstrate the copolymer of trimethylamine methacrylimide and vinyl chloride to contain the comonomers in a ratio of 3 to 1 of vinyl chloride to trimethylamine methacrylimde.

EXAMPLE 10

Into a 100 ml serum bottle is charged, under nitrogen, a 75 ml solution of 0.03 g of azo-bis-isobutyronitrile, 7.11 g (0.05 mole) of trimethylamine methacrylimide, 10.60 g (0.20 mole) of acrylonitrile in purified acetonitrile. The bottle is sealed and suspended in a water bath maintained at 70° C for 2 hours. The bottle is then vented and opened and the contents poured into ether in a Waring blender. The precipitate is collected by filtration, washed with ether, and dried under high vacuum. A solid copolymer of acrylonitrile and trimethylamine methacrylimide containing about 33.5 percent of the aminimide is obtained and weighs 1.1 g.

EXAMPLE 11

Into a 150 ml reactor equipped with stirrer, N$_2$ bubbler, condenser and addition funnel is placed 50 ml of acetonitrile and 0.5 g of azo-bis-isobutyronitrile. The reactor is sealed and flushed with nitrogen and the temperature brought to 80° to 90° C. To the reaction mixture is then added, over 1 hour, a solution containing 8 g of trimethylamine methacrylimide, 4 g of hydroxy propyl methacrylate, and 28 g of methyl methacrylate. Heating is continued for an additional hour. A solid terpolymer of methyl methacrylate, hydroxy propyl methacrylate, and trimethylamine methacrylimide (53 percent) in a monomer ratio of 9:1:1 respectively is obtained.

On heating to 165° C, trimethyamine is liberated from the terpolymer with formation of isocyanate groups. A 50 percent solution of the terpolymer in acetone is prepared and a 3 mil film is drawn down. The film is allowed to air dry for 2 days, and is found to have a Sward Hardness of 42 to 43. The film is then heated to 170° C for 15 minutes. Evolution of trimethylamine is noted during heating. The Sward Hardness of the heated film increases to 54 to 55, indicating the formation of a cross-linked polymer. Infrared analysis indicates the presence of urethane linkages in the heated terpolymer.

EXAMPLE 12

Into a 1-liter, 5-neck flask equipped with a stirrer, reflux condenser, temperature controller probe, addition funnel, and $N_2$ bubbling tube 255 parts of water are added, stirred and flushed with $N_2$ for 15 minutes. At this time, 42 parts of an anionic surfactant, such as Abex 18S, is added and dissolved. Ten percent of the monomer mixture (150 parts of ethyl acrylate, 17 parts of trimethylamine methacrylimide, 50 parts of hydroxypropyl methacrylate, and 80 parts of methyl methacrylate) as added and flushed. The reaction vessel is put under a $N_2$ pressure of 20 bubbles per minute, and heated to 70° C. At this point, 3.0 parts of $K_2S_2O_8$ are added and the reaction is allowed to initiate. The addition of the remainder of the monomers is continued over a 1 hour period.

The polymer is purified by precipitating in water and by several washings with water. An interpolymer of the four monomers is obtained. The monomer ratio in the polymer is approximately 19:10:1:1, of ethyl acrylate to methyl methacrylate to hydroxypropyl methacrylate to trimethylamine methacrylimide respectively. The molecular weight of the polymer is about 11,200.

EXAMPLE 13

Into a 3-neck, 250 ml stirred flask equipped with a reflux condenser and temperature controller is added 100 g of acetonitrile. To this solvent is added 7.3 g of trimethylamine methacrylimide, 25 g of methyl methacrylate, and 5.5 mg of azo-bis-isobutyronitrile which is then flushed with $N_2$ for 15 minutes at approximately 200 bubbles per minute.

The flask is then placed under $N_2$ pressure and heated to 80° C for 2 hours. The polymer is purified by precipitation in water stirred by a Waring blender, redissolved in acetone, and precipitated again in a Waring blender with water, followed by five water washes. A solid copolymer of methyl methacrylate and trimethylamine methacrylimide having a molecular weight of about 5,600 is obtained. The monomer ratio in the copolymer is approximately 20 methyl methacrylate units to 1 trimethylamine methacrylimide unit.

EXAMPLE 14

Condensed into a 1-liter Parr bomb which has been flushed with nitrogen, cooled to −75° C in a dry ice-acetone bath and flushed with vinyl chloride, are 167 parts of vinyl chloride. The sealed bomb is then placed in the heater and the stirrer is turned on at 400–500 rpm.

Separately, a solution is prepared containing 844 parts of water, 6 parts of conc. $NH_4OH$, 0.20 part of $AgNO_3$, 3.0 parts of $K_2S_2O_8$, 40.0 parts of trimethylamine methacrylimide, and 18.0 parts of an anionic surfactant, such as dodecylbenzene sodium sulfonate.

When the bomb and vinyl chloride reach room temperature, 52.5 parts of the above emulsion are added under pressure. The bomb contents are then heated to 50° C and maintained at that temperature for about 12 hours. Excess vinyl chloride in then vented and a solid copolymer of vinyl chloride and trimethylamine methacrylimide is obtained on coagulation and filtration of the reaction mixture.

EXAMPLE 15

Into a reactor equipped with a stirred dropping funnel, stirrer, dry ice trap, and vacuum line is charged 250 ml of dibutyl phthalate. The dibutyl phthalate is heated to 170° C in vacuo of 50 mm Hg. To this is added 250 ml of dibutyl phthalate containing, in suspended form, 27.5 g (1.93 moles) of trimethylamine methacrylimide over a period of 45 minutes. A light yellow liquid is collected in the trap. Redistillation of the liquid results in 7.7 g (48 percent) of clear liquid. The infrared spectrum shows the compound to contain both an isocyanate group and ethylenic unsaturation.

The foregoing examples have illustrated the preparation of the novel aminimides of the present invention, the formation of homo- and copolymers from the aminimides, and the conversion of the polymeric aminimides to isocyanate group-containing polymeric materials. It will be apparent that the foregoing illustrated methods of preparing and polymerizing the aminimide can similarly be employed in the preparation and polymerization of other aminimides coming within the scope of the present invention. Other methods of polymerizing the aminimides of the present invention as well as the formation of other types of copolymers of the aminimides will be apparent from the foregoing specific illustrations. It is therefore not intended to limit the scope of the present invention to the specifically illustrated embodiments thereof, since varied modifications and variations will be apparent to those skilled in the art.

I claim:

1. An addition homo- or copolymer of an aminimide having the formula:

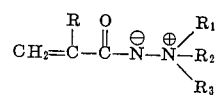

wherein R is hydrogen, a lower alkyl group, phenyl, chlorine, fluorine, bromine or a cyano group; $R_1$, $R_2$ and $R_3$, when taken singly, represent a phenyl or an alkyl radical having from 1–22 carbon atoms and wherein $R_1$ and $R_2$, when taken collectively with the nitrogen atom to which they are attached, represent a heterocyclic ring selected from the group consisting of pyrrolidine, pyrrole, pyrroline and piperidine.

2. An addition copolymer in accordance with claim 1.

3. An addition copolymer in accordance with claim 2 wherein $R_1$, $R_2$ and $R_3$ of said aminimide each represents a lower alkyl radical.

4. An addition copolymer in accordance with claim 3 wherein R of said aminimide represents hydrogen or a methyl radical.

5. An addition copolymer in accordance with claim 4 wherein the comonomer is selected from the group consisting of an acrylate, a vinyl halide, a vinyl ester, a vinyl aromatic monomer and acrylonitrile.

6. An addition copolymer in accordance with claim 5 wherein said comonomer is an acrylate.

7. An addition copolymer in accordance with claim 6 wherein said acrylate is methyl methacrylate.

8. An addition copolymer in accordance with claim 5 wherein said comonomer is a vinyl ester.

9. An addition copolymer in accordance with claim 5 wherein said comonomer is a vinyl chloride.

10. An addition copolymer in accordance with claim 5 where said comonomer is acrylonitrile.

* * * * *